May 26, 1964
J. H. CHOUINARD
3,134,118
LAWN SWEEPER ATTACHMENT
Filed Sept. 12, 1962
3 Sheets-Sheet 1
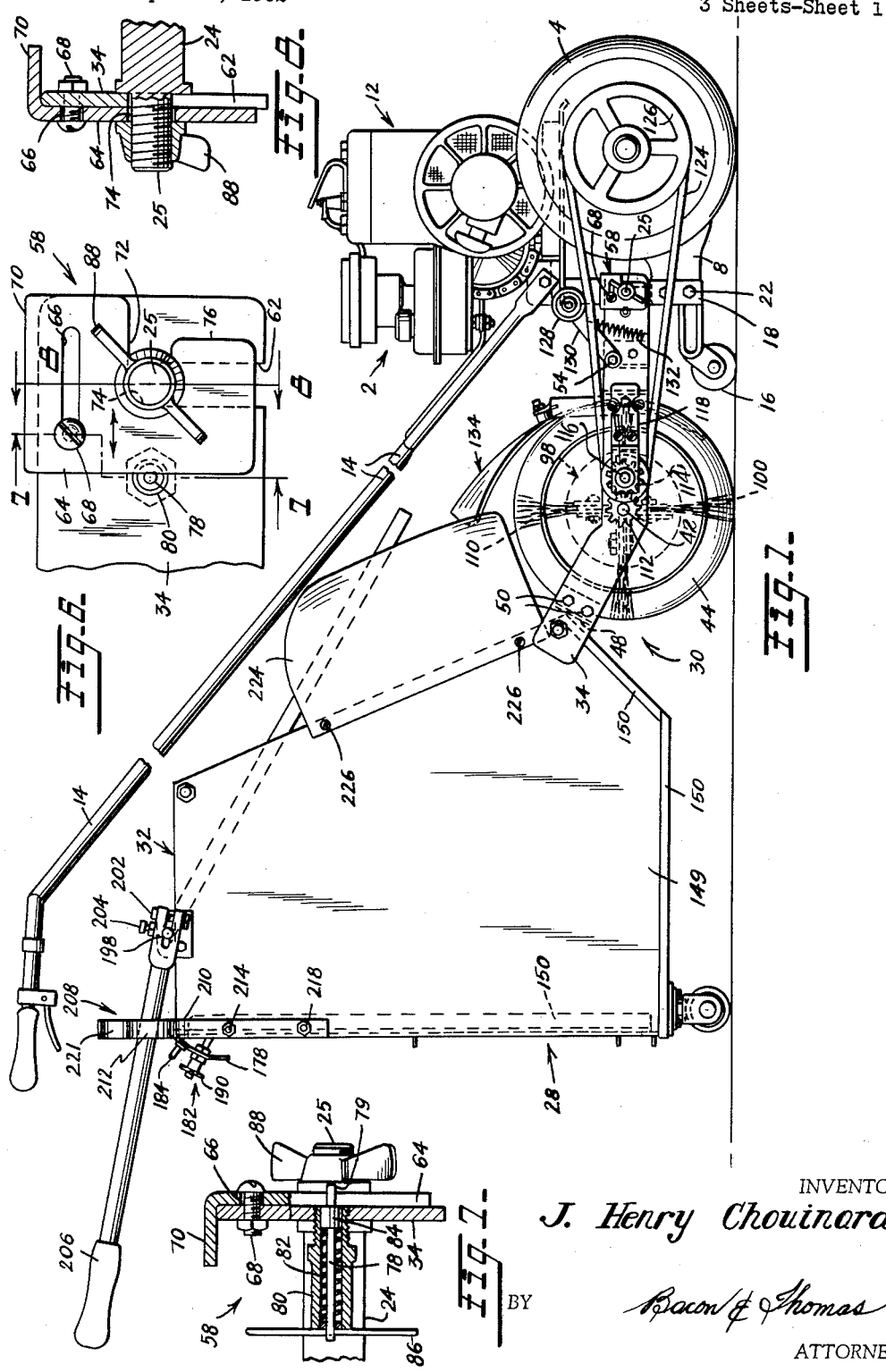
INVENTOR
J. Henry Chouinard
BY
Bacon & Thomas
ATTORNEYS May 26, 1964
J. H. CHOUINARD
3,134,118
LAWN SWEEPER ATTACHMENT
Filed Sept. 12, 1962
3 Sheets-Sheet 2
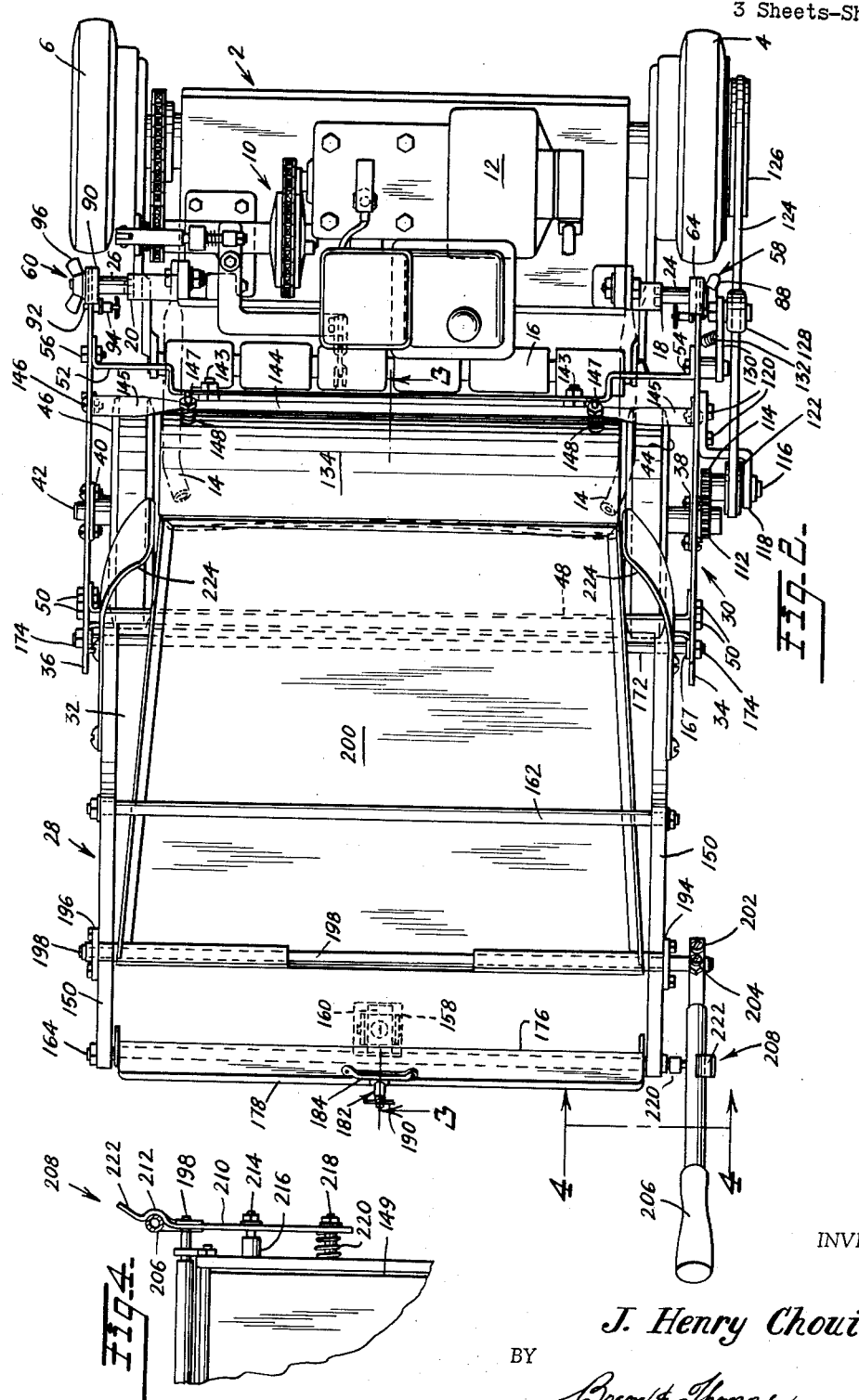
INVENTOR
J. Henry Chouinard
BY
Bacon & Thomas ATTORNEYS

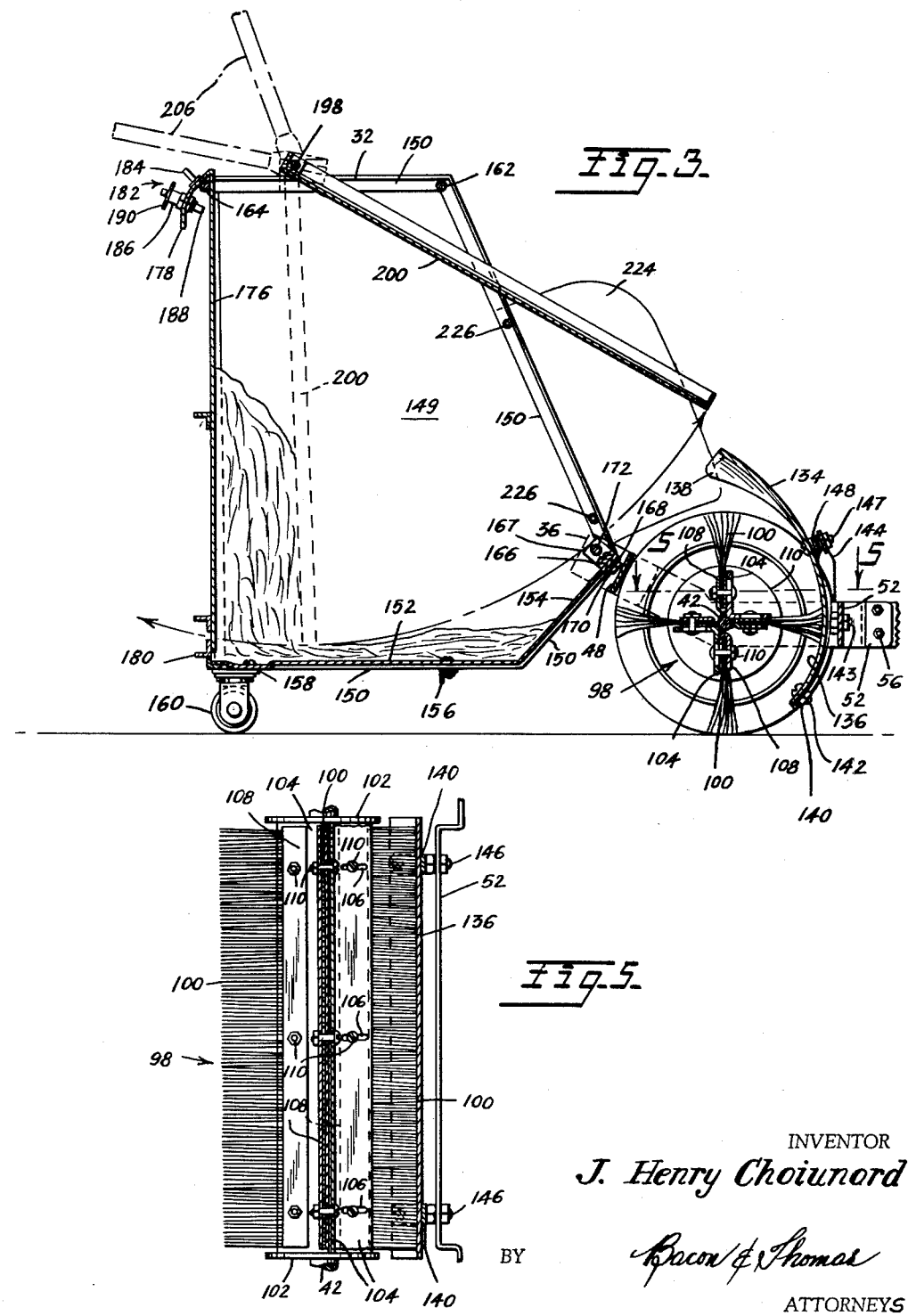

3,134,118
LAWN SWEEPER ATTACHMENT
Joseph Henry Chouinard, 34 Broad St.,
East Hartford, Conn.
Filed Sept. 12, 1962, Ser. No. 223,590
18 Claims. (Cl. 15—79)

This invention relates generally to lawn sweeper attachments for lawn mowers, and more particularly, to an improved lawn mower-powered sweeper which can be easily secured to, and detached from a lawn mower, and which is constructed to facilitate handling of debris gathered by the sweeper.

The desirability of at least periodically removing grass clippings and other debris from a lawn has long been recognized. Accordingly, numerous lawn sweeper constructions have been proposed, both for independent use and for use with a lawn mower. The latter type has one obvious advantage in that the lawn can be mowed and swept in one operation, thus resulting in a substantial saving of time. It is to this latter type of lawn sweeper that this invention relates.

The lawn sweeper of the present invention is designed for use with a powered, reel-type mower, and includes a frame-work mounted upon a pair of wheels and connected to the mower, and a rotatable brush assembly which is driven through a belt from the mower. In past lawn sweepers, the apparatus utilized for connecting the frame of the sweeper to the lawn mower has commonly proved to be inadequate, either because the connection was not sufficiently secure to maintain the two devices in an attached relationship under adverse conditions of use, or because the connecting device, through secure, was difficult to engage and disengage because of cumbersome structure and, moreover, took a great deal of time. The present invention overcomes these common failures of past devices by providing a connection means that can be readily locked in either its open disengaged or its closed engaged position, and which when locked in its closed position cannot become accidentally disengaged.

The present lawn sweeper includes a brush assembly that rotates in a direction opposite to that in which the reel of the mower turns, and functions to sweep up debris from the lawn. A cowling extends over the front of the brush assembly, and therewith to direct the gathered debris into a container carried by the sweeper frame. In many past lawn sweepers, it has been difficult to obtain the desired spacing for the brush assembly relative to the other members of the sweeper, and difficult to maintain the desired relationship once it has been obtained because of wear on the brushes. In accordance with the present invention, the position of the brush assembly can be readily set and/or adjusted, and provisions are made to compensate for brush wear; thus, the above-described brush difficulties encountered in many prior sweepers are overcome.

The container into which the debris is thrown by the rotation of the brush includes means for compacting said debris, and means whereby the container can be easily emptied. Many arrangements for compacting debris have been devised, but most involve complicated lever arrangements which are cumbersome or easily become fouled in use. The present invention utilizes a simple compacting plate, which is swiveled at its upper end, and which is operated directly by a handle at one side of the container; thus, there are no linkages that can become jammed from exposure to dirt, grass clippings and the like. Moreover, a novel, structurally uncomplicated device for positively securing the handle in its non-active position is provided. Thus, another common difficulty with lawn sweepers has been overcome by the instant apparatus.

The debris container of the present invention has a back plate constructed so that it can be easily displaced to permit emptying of the container upon actuation of the compacting plate for this purpose, and yet will not become separated from the lawn sweeper. Thus, debris can be taken from the container without disconnecting the sweeper from the mower, without inverting the container, and without digging with the hands or some implement, all of which have been common practices in the past. The advantages to be derived in convenience and safety from the container construction of the invention are therefore readily seen.

It is, therefore, an object of this invention to provide a lawn sweeper attachment for use with reel type lawn mowers for removing debris from a lawn simultaneously with the mowing thereof.

Another object is to provide a rotating, brush type lawn sweeper attachment wherein the brush assembly is rotatably driven from the lawn mower and can be readily adjusted for maximum operating effectiveness.

It is also an object to provide a rotating brush assembly for a lawn sweeper which can be readily adjusted to compensate for brush wear.

A further object is to provide a connecting device for attaching a lawn sweeper to a lawn mower which can be easily manipulated without tools, and which is completely secure when in a closed, connected position.

A still further object is to provide a debris container for a lawn sweeper, said container being constructed for easy emptying when in its normal upright operating position.

A still further object is to provide a compacting device for the debris container of a lawn sweeper, which can be easily and conveniently operated from the rear of the container to compact light twigs, leaves and other foreign matter, as well as grass cuttings.

Still another object is to provide a device for positively locking the operating handle of the debris compacting device in an inactive position.

Other objects and many of the attendant advantages of the invention will be readily apparent from the following detailed description when considered in connection with the accompanying drawings, wherein:

FIG. 1 is a side elevational view of the lawn sweeper of the invention connected to a powered reel lawn mower; the rotating brush assembly being shown in dotted lines;

FIG. 2 is a plan view of the apparatus shown in FIG. 1 with only a portion of the lawn mower handle being shown in dot-and-dash lines;

FIG. 3 is a vertical sectional view through the lawn sweeper, taken on line 3—3 of FIG. 2;

FIG. 4 is a fragmentary sectional view, taken generally on line 4—4 of FIG. 2, showing the elevation the locking device for the operating handle of the compacting plate;

FIG. 5 is a horizontal sectional view, taken on line 5—5 of FIG. 3, showing in detail the wear adjusting means for the rotating brush assembly;

FIG. 6 is an enlarged elevational view of the connecting device for securing the lawn sweeper to the lawn mower;

FIG. 7 is a sectional view, taken on line 7—7 of FIG. 6, particularly showing a detent pin provided for securing a manually operable locking slide in position; and FIG. 8 is a vertical sectional view, taken on line 8—8 of FIG. 6.

The lawn sweeper of the present invention is illustrated as being utilized with a motor-powered reel type lawn mower, but it is to be understood that it can also be utilized with a hand or other type of mower, without departing from the invention.

Referring now to FIGS. 1 and 2 of the drawings, a reel lawn mower is indicated generally at 2, and includes a pair of ground engaging wheels 4 and 6, which are attached to a frame 8 and are driven through a mechanical chain and sprocket mechanism 10 by a gasoline engine 12 mounted on top of said frame. A bifurcated handle 14 is pivotally connected to the top of the mower frame 8 just behind the engine, and functions to guide the mower over the lawn, as is well understood. A ground engaging roller 16 is secured to the bottom rear edge of the frame 8, and provides the aft support for the mower. The mower structure thus far described is conventional.

Vertical attachment bars 18 and 20 are secured, as by bolts 22, to the opposite sides of frame 8 between the mower wheels 4 and 6, and roller 16. The bars 18 and 20 have outwardly projecting, threaded studs 24 and 26, respectively (FIG. 2), mounted thereon midway of their height; these attachment bars and their projecting studs are utilized for connecting the lawn sweeper attachment of the invention to the lawn mower.

The lawn sweeper attachment is indicated generally at 28 and includes a sweeper unit 30 and a debris container 32. The sweeper unit 30 includes a pair of angled, flat, side support plates 34 and 36 having confronting bores therethrough about which are bolted journal plates 38 and 40, respectively, for receiving a through shaft 42 (FIGS. 1 and 2). A pair of ground engaging wheels 44 and 46 are mounted upon said shaft 42 inwardly of the side support plates 34 and 36 for free rotation, and provide support for the forward end of the sweeper unit.

Rigidity is imparted to the sweeper unit 28 by a rear cross member 48 having a right angle bent portion at each end and secured in position relative to side plates 34 and 36 by bolts 50; and by a front cross member 52 having similarly bent end portions and secured to side plates 34 and 36 by bolts 54 and 56, respectively. The sweeper unit is connected to the mower by connecting devices 58 and 60 mounted on the forward ends of side plates 34 and 36, respectively; the connecting devices 58 and 60, which are identical in construction, can best be understood by reference to FIGS. 6–8, wherein the device 58 is shown on an enlarged scale.

Connector 58 is associated with a vertical notch 62 in the bottom edge of the forward end of plate 34, which notch is of a size to receive the threaded end 25 of stud 24. A slidable locking plate 64 having a slot 66 therein is secured to side plate 34 by a bolt 68, and is arranged for horizontal movement in a direction at a right angle to vertical notch 62. The plate 64 has an inturned lip 70 at its upper end, which rides on the top edge of plate 34 to thereby insure that the plate 64 remains properly aligned with the plate 34 as it slides thereon. The plate 64 has a horizontal notch 72 about midway thereof which extends at a right angle to notch 62, and which also is of a size to receive the end 25 of stud 24. The notches 62 and 72 are so positioned and are of such a depth that when the locking plate 64 is in the position shown in FIG. 6, the overlapping portions of said notches define an opening 74 of a size which closely receives stud end 25. At such time, the left end of the slot 66 is engaged with the bolt 68.

The manner in which the connecting device 58 functions to connect the sweeper to the lawn mower, is as follows. Initially, the locking slide 64 is moved back to the left, away from notch 62 until said notch is fully uncovered; in other words, until the right end of slot 66 engages the bolt 68. In the device as shown in the drawings, the lower forward edge 76 of the plate 64 has been cut away, so that the plate need not be moved too great a distance. When notch 62 is fully exposed, the side plate 34 is positioned above the stud end 25 to align the notch therewith, and said plate is then lowered so that the stud end is received in the notch. The depth of the notch 62 is such that when the stud end 25 is fully seated therein, said stud end will confront notch 72 in locking plate 64. The locking plate 64 is then moved forward, or to the right, thus enclosing the stud end 25 so that while it can rotate relative to plate 34, it cannot move laterally in any direction. Thus, the side plate 34 is locked to the mower, but may pivot vertically about stud 24.

The locking plate 64 is secured in its closed or locking position by a detent pin 78, best shown in FIG. 7. The pin 78 is received within a cylindrical housing 80, which is located on the inner side of plate 34 and threaded into an opening in said plate, the pin having a rounded end portion 79, which projects through said opening at a point adjacent to the left side edge of said plate to secure the same in place. The housing 80 is closed at its opposite end, and a spring 82 is compressed between said closed end and a collar 84 on the pin. A cross rod 86 is secured to the other end of pin 78 exteriorly of the housing 80, and serves both as a handle for manually retracting the pin and as a stop for preventing said pin from being forced out of housing 80 by spring 82. The plate 64 is proportioned so that the pin 78 can also function to hold said plate in its retracted, open position; in such instance the pin is engaged with the bottom wall of notch 72. Thus, by securing the locking plate 64 in its retracted position the pin 78 greatly facilitates assembly of the lawn sweeper with the lawn mower.

For further security in connecting the side plate 34 to the mower, a wing nut 88 is shown threaded upon stud end 25. This stud end could be made plain and the nut could be eliminated, but the presence of said nut does insure that the sweeper frame will not spread apart laterally sufficiently to slip off the studs.

The connecting device 60, as has been stated, is identical to the device 58, and includes a locking plate 90, FIG. 2, a locking pin 92 and its housing 94, and a wing nut 96 threaded onto stud 26. Thus, by providing the devices 58 and 60, the sweeper 28 can be readily and securely connected to the lawn mower 2, and may freely pivot vertically relative thereto to accommodate rough terrain.

The rotary brush assembly 98, FIG. 3, of the sweeper 28 is mounted upon shaft 42 and comprises four transversely extending, equally spaced brushes 100 projecting radially of said shaft. As is best shown in FIGS. 3 and 5, a pair of spaced disks 102 are welded to shaft 42, and two L-shaped or angle members 104 are welded between said disks and to the shaft 42, the members 104 being arranged upon diametrically opposite sides of said shaft so that their legs project parallel to radial planes passing through the shaft 42, 90 degrees apart. Each leg of each member 104 has a plurality of radially-extending, spaced slots 106 therein. Each brush 100 includes a base 108, which is secured to one leg of one of the members 104 by bolts 110 passing through slots 106. Thus, the radial projecting distance of the brushes 100 may be readily adjusted for the full length of the slots 106. This radial adjustment feature not only permits the brushes 100 to be adjusted for maximum operating efficiency, but also provides a means for compensating for brush wear.

Because the brushes 100 are rigidly secured to shaft 42, they will rotate therewith. The shaft 42, as has been mentioned, is mounted for rotation within the journals 38 and 40 on side plates 34 and 36, and is free to rotate relative to the wheels 44 and 46. The end of shaft 42 which passes through journal 38 and plate 34 has a gear 112, FIGS. 1 and 2, secured thereto, which gear meshes with a second gear 114 carried on a stud shaft 116. One end of shaft 116 is fixed on plate 34, and the other passes through one end of a bent bracket 118, which is secured to plate 34 by bolts 120.

The gear 114 is part of an integral member which has a pulley 122 at its other end, over which a belt 124 passes. The belt 124 also passes over a larger pulley 126 attached concentrically to mower wheel 4. Tension in the belt 124 is maintained by an idler wheel 128, which rides thereon, and which is carried by one end of an arm 130 pivotally connected at its opposite end to an extension of bolt 54. A tension spring 132 is secured at its opposite ends to arm 130 and plate 34, and supplies force to keep belt 124 taut. Thus, rotation of mower wheel 4 and pulley 126 causes the belt 124 to rotate gear 114, which in turn rotates gear 112 and shaft 42, whereby the attached brushes 100 are driven in a direction opposite to that in which the mower wheel 4 and pulley 126 turn.

Fitted over the front of rotary brush assembly 98 is a cowling 134, FIGS. 1 to 3, which includes an arcuate lower portion 136 and a transversely curved deflector hood 138. The lower portion 136 of the cowling is stiffened and supported by a pair of spaced, arcuate brackets 140, to which it is attached by bolts 142. The upper portion of the brackets carry studs 143 which secure the same to the cross bar 52. The cowling 134 is further supported by a flat cross-brace 144 having ends 145 secured to plates 34 and 36 by bolts 146. Bolts 147 secure the cowling 134 to the cross-brace 144. Washers 148 on the bolts 147 are inserted between cross-brace 144 and the cowling 134, and by varying the number employed, the spacing between the cowling and the brush assembly 98 can be readily adjusted.

The debris container 32 comprises a pair of side walls 149, each having five sides with external reinforcing angle members 150 secured to their edges; a flat bottom wall 152; and an inclined front plate 154. The bottom wall 152 is supported transversely by an angle member 156, which is bolted to the side plate reinforcing members 150, and by a bar 158 at the rear thereof to which is centrally bolted a single ground engaging swivel roller 160.

The side walls 149 are connected at their top edges by front and rear transverse tie rods 162 and 164, respectively. Inner and outer reinforcing strips 166 and 168, respectively, engage the top edge of the inclined front plate 154, the inner strip 166 having right angle bent portions 167 at each end thereof. The two strips 166 and 168 are secured in clamping relationship to plate 154 by bolts 170, and furnish support for a transversely extending pivot rod 172, which extends through the bent end portions 167 of bar 166, side plates 149, and the rear ends of side plates 34 and 36. The rod 172 is secured in position by nuts 174 threaded onto each end thereof, and thus pivotally connects container 32 to the sweeper unit 30.

A rear opening in the container 32 is closed by a back plate 176, which has an outwardly bent angular strip or flange 178 along its top edge that engages the top surface of the tie rod 164 to thus pivotally hang said plate thereon. An angle member 180 is attached to the bottom rear corners of the side plates 149, and defines a ledge against which plate 176 seats to prevent it from pivoting outwardly until desired.

The back plate 176 may be completely removed, or it may be manually raised to a position to clear the angle member 180, swung rearwardly and then lowered. The plate 176 is then free to swing rearwardly to permit emptying of the container 32. The back plate 176 is secured against removal by a latching device generally identified by the numeral 182. As is shown in FIG. 3, a handle 184 is mounted on the flange 178 of the back plate 176 and can be used to manually raise or to remove said plate. The latching device 182 includes a housing 186 mounted upon the overhanging flange portion 178 of the back plate 176. The housing 186 contains a spring-pressed plunger 188. The plunger 188 has a rod 190 connected thereto that is manually operable to retract said plunger. The plunger 188 is so positioned that when the back plate 176 is manually raised to clear the angle member 180, the plunger will engage the tie rod 164 and prevent removal of said plate. The plunger 188 can be retracted to avoid the tie rod 164 to permit removal of the back plate 176.

In replacing the back plate 176, it is not necessary to manually retract the plunger 188. The angularity of the end of the plunger 188 with respect to the tie bar 164 is such that when the flange 178 of the back plate 176 is positioned above the tie bar 164 and said plate is dropped onto the tie bar 164, the plunger will be automatically retracted upon engaging said tie bar to permit the back plate 176 to drop by gravity into position to completely close the rear opening of the container 32.

The container 32 also includes a device for compacting debris therein, a function which is necessary if any great amount of material is to be collected in said container. The angle members 150 at the top edges of the side walls 149 have aligned journal members 194 and 196 secured thereto for receiving a shaft 198. To this shaft is rigidly secured the top edge of a reinforced, compacting plate 200 having a width such that it is easily received between the side walls 149. The end of shaft 198 protrudes beyond journal 194, and has fixedly attached thereto, by a clamping bolt 202 and a set screw 204, the bifurcated end of an operating handle 206. Thus, by manipulating the handle 206 up and down at the rear of the container 32, the compacting plate 200 can be oscillated about the axis of shaft 198 to compact material in the container, as is indicated in FIG. 3 by broken lines.

As will be obvious, when the sweeper unit 30 is operating, it is desirable that the compacting plate 200 be in the elevated, or full line position shown in FIG. 3 of the drawings, wherein it also functions as a front wall for the container and as a guide for debris being swept up by the brush assembly 98. A device for securing the handle 206 in position to cause the plate 200 to remain in its elevated position is indicated at 208, and is best shown in FIGS. 2 and 4.

The handle locking device 208 includes a keeper 210 having its upper end bent at 212 to provide a recess to receive the handle 206. The keeper 210 is pivotally mounted at about its center upon a reduced portion of a bolt 214 projecting from side plate 149. The bolt 214 has an enlarged portion 216 located inwardly of keeper 210, which may, if desired, consist of a collar carried by the bolt, to retain the keeper in proper position and away from the plate 149. A second bolt 218 projects from the plate 149 and passes through the lower end of keeper 210, and functions to clamp a spring 220 in a compressed state between the plate 149 and said keeper. Thus, the upper end of the keeper 210 is constantly urged toward the handle 206 by spring 220, which handle is normally received within and held stationary by the bent portion 212 of the keeper.

The handle 206 is easily released from keeper 210 to permit plate 200 to be operated for compacting material in the container, by merely pulling the top end of the keeper sidewise against the force of spring 220. The keeper then pivots upon the bolt 214 as a fulcrum. Similarly, the handle can be locked by merely pushing down on it until keeper 210 rides thereover into locking engagement; an inclined tip 222 on the keeper acting as a cam surface to aid in this function.

In operation, leaves, grass clippings and other debris is picked up by the rotating brush assembly 98, in cooperation with the lower portion of cowl 134, and is directed back into container 32 and toward the central portion thereof by the bowed deflector hood portion of the cowling. A pair of flexible flaps 224 is secured to the forward edge of each side plate 149 by bolts 226, and together with raised plate 200 aid in guiding the debris into the container 32. Periodically, the plate 200 is operated by handle 206 to compact the collected debris. When the container 32 is full, the back plate 176 is manually raised to clear angle member 180 and swung rearwardly and held in such position to permit easy emptying of the container upon actuation of the plate 200 to force debris from the container. If desired, the plate 176 can be removed from the container 32, as previously explained, prior to displacing the debris therefrom.

It should be noted that the rotational speed of the brush assembly 98, because pulley 122 is considerably smaller than pulley 126, is faster than the rotational speed of wheel 4. Thus, the brush assembly 98 is capable of more efficient sweeping than would be possible if it rotated at the same number of revolutions per minute as the mower wheel.

The mounting of the rotating brush assembly 98 upon the same axis of rotation as the sweeper unit supporting wheels 44 and 46 provides a unique advantage in that the height of the brushes above the ground is constant; thus, it can operate continuously at its most advantageous position. Further, the articulated arrangement of the mower, the sweeper unit, and the debris container permits the lawn sweeper of the subject invention to move freely over hilly, uneven ground.

Obviously, many modifications and variations of the present invention are possible in the light of the above teachings. It is, therefore, to be understood that within the scope of the appended claims, the invention may be practiced otherwise than as specifically described.

I claim:

1. A lawn sweeper attachment for use with a lawn mower, comprising: a wheel-supported sweeper unit including a rotatable brush assembly; means for pivotally connecting said unit behind the cutting apparatus of a lawn mower; power transmission means for interconnecting said unit and said lawn mower for rotatably driving the brush assembly of said sweeper unit; and a debris container positioned behind, and pivotally connected to said sweeper unit.

2. A lawn sweeper attachment as recited in claim 1, wherein said sweeper unit is supported by a pair of wheels mounted for rotation about a transverse axis, and wherein the brush assembly is arranged for rotary motion about said same transverse axis.

3. A lawn sweeper attachment as recited in claim 2, wherein said brush assembly is arranged to normally rotate in a direction opposite to said pair of supporting wheels, and wherein a cowling is disposed over a portion of said brush assembly and arranged to direct debris swept up by said assembly into said container.

4. A lawn sweeper attachment for use with a lawn mower, comprising: a sweeper unit including a transversely disposed rotatable brush assembly; ground-engaging wheel means attached to said unit; means for pivotally connecting said unit to, and behind the cutting apparatus of, a lawn mower; power transmission means for interconnecting said mower and said sweeper unit for rotating said brush assembly; a debris container pivotally connected behind said sweeper unit and arranged to receive debris swept up by said brush assembly; and ground-engaging roller means secured to said container.

5. A lawn sweeper attachment as recited in claim 4, wherein said brush assembly includes a shaft, a plurality of radially directed, axially extending members secured to said shaft, a like plurality of elongated brushes each having a base, and means adjustably securing each brush to one of said members, whereby the radial distance between said shaft and the base of each brush can be adjusted.

6. A lawn sweeper attachment as recited in claim 5, wherein the securing means includes a plurality of spaced, radially extending slots in said brush supporting members, and bolt means passing through said slots clamping said brushes to said members.

7. A lawn sweeper attachment as recited in claim 4, wherein the wheel means includes a pair of wheels arranged to freely rotate about the same transverse axis as that about which said brush assembly rotates, and wherein said brush assembly is arranged to normally rotate in the opposite direction to that of said wheels.

8. A lawn sweeper attachment as recited in claim 7, wherein the sweeper unit additionally includes a cowling positioned over a portion of the front of said brush assembly arranged to direct debris swept up thereby into said container.

9. A lawn sweeper attachment as recited in claim 4, wherein the container includes means for compacting debris contained therein, said compacting means including a plate suspended for pivotal movement from the top of said container, and means for oscillating said plate.

10. A lawn sweeper attachment as recited in claim 4, wherein said container includes a pair of side walls, a bottom wall connected to said side walls, a transverse rod attached to said side walls at the top thereof and extending across said container, a rear closure plate pivoted on said rod, and means for releasably securing said closure plate in a closed position.

11. A lawn sweeper attachment as recited in claim 10, wherein the releasable securing means comprises a housing mounted upon said closure plate below said transverse rod, a plunger extending from said housing and being engageable with a portion of said rod for holding said plate against upward movement; and resilient means normally urging said plunger into a position in locking relation to said rod.

12. A lawn sweeper attachment as recited in claim 4, wherein said means for pivotally connecting said sweeper unit to said lawn mower comprises a pair of laterally extending studs on said mower, a pair of spaced frame members on said sweeper unit each having a vertical notch therein for receiving one of said studs, and a locking plate carried by each of said frame members and arranged for sliding movement in a direction normal to said vertical notches, each of said locking plates having a horizontally extending notch therein positioned to confront one of said studs when it is fully received within said vertical notch.

13. A lawn sweeper attachment as recited in claim 12, including detent means on each of said spaced frame members for securing said locking plates against movement when they are positioned with said studs fully received within said horizontal notches.

14. In a lawn sweeper, a container for receiving debris swept up by said sweeper, comprising: a pair of side walls; a bottom wall connected to said side walls; a transverse tie rod connecting said side walls at the top rear corner thereof; a rear closure plate having an outwardly directed flange on its top edge, said flange being disposed over said tie rod; a cross member extending between said side walls at the bottom rear corner thereof and defining a ledge, the bottom of said closure plate normally being disposed behind said ledge; and means engageable with said flange and said cross member for releaseably securing said closure plate in position behind said ledge.

15. In a lawn sweeper, a container as recited in claim 14, including a transverse shaft rotatably attached to and extending between the top portions of said side walls; a compacting plate rigidly attached at one edge to said shaft and moveable between said side walls; and a handle secured to said shaft for moving said compacting plate.

16. In a lawn sweeper, a container as recited in claim 15, including means for retaining said handle in a position wherein said compacting plate is in a raised position, said means comprising a keeper pivotally attached at about its center to one of said side walls; means on one end of said keeper for engaging said handle; and resilient means for urging the other end of said keeper to cause said one end to pivot into engagement with said handle.

17. In a lawn sweeper attachment for use behind a lawn mower, means for connecting said attachment to a lawn mower, comprising at least one laterally extending stud on said mower; a supporting plate on said attachment having a vertical notch in its lower edge of a size to receive said stud; a locking plate attached to said supporting plate and in non-rotatable relation thereto, arranged to slide toward and away from said vertical slot in a direction normal thereto; a horizontal notch in the forward edge of said locking plate arranged to generally confront the bottom of said vertical notch, said stud being first receivable in said vertical notch and said locking plate then being slidable into a position where said stud is also disposed within said horizontal notch; and means on said stud for applying force to said locking plate to clamp it against said supporting plate for securing said locking plate in said last-mentioned position.

18. A connecting means as recited in claim 17, wherein said last-mentioned means includes a housing attached to said supporting plate; a detent pin disposed within said housing and moveable through an opening in said supporting plate to engage an edge of said locking plate; and resilient means for urging said pin into engagement with said edge.

References Cited in the file of this patent

UNITED STATES PATENTS

| | | |
|---|---|---|
| 744,460 | Battle | Nov. 17, 1903 |
| 1,740,782 | Ratigan | Dec. 24, 1929 |
| 2,086,414 | Greble | July 6, 1937 |
| 2,191,601 | Wessock | Feb. 27, 1940 |
| 2,333,925 | Grossett | Nov. 9, 1943 |
| 2,495,928 | Geraldson | Jan. 31, 1950 |
| 2,517,335 | Muzzy | Aug. 1, 1950 |
| 2,591,916 | Caughman | Apr. 8, 1952 |
| 2,670,486 | Daniel | Mar. 2, 1954 |
| 2,703,244 | Nearing | Mar. 1, 1955 |
| 2,834,034 | Angell | May 13, 1958 |
| 2,984,850 | Law et al. | May 23, 1961 |
| 3,048,868 | Clark | Aug. 14, 1962 |

FOREIGN PATENTS

| | | |
|---|---|---|
| 45,698 | France | Aug. 26, 1935 |
| | (1st addition of 752,986) | |
| 752,986 | France | Oct. 4, 1933 |